United States Patent
Stoller et al.

(10) Patent No.: US 7,361,886 B2
(45) Date of Patent: Apr. 22, 2008

(54) CORRECTIONS OF GAMMA-RAY RESPONSES

(75) Inventors: Christian Stoller, Princeton Junction, NJ (US); Michael Evans, Missouri City, TX (US); Charles Flaum, Ridgefield, CT (US)

(73) Assignee: Schlumberger Technology Corporation, Sugar Land, TX (US)

( * ) Notice: Subject to any disclaimer, the term of this patent is extended or adjusted under 35 U.S.C. 154(b) by 57 days.

(21) Appl. No.: 11/307,629

(22) Filed: Feb. 15, 2006

(65) Prior Publication Data

US 2006/0192095 A1     Aug. 31, 2006

Related U.S. Application Data

(60) Provisional application No. 60/657,180, filed on Feb. 28, 2005.

(51) Int. Cl.
    *G01V 5/04* (2006.01)
(52) U.S. Cl. .................................. 250/269.1
(58) Field of Classification Search ............ 250/269.6, 250/269.1, 261
    See application file for complete search history.

(56) References Cited

U.S. PATENT DOCUMENTS

| | | | |
|---|---|---|---|
| 2,345,119 A | 3/1944 | Hare | |
| 2,475,137 A | 7/1949 | Herzog | |
| 2,648,780 A | 8/1953 | Herzog | |
| 2,761,977 A | 9/1956 | McKay | |
| 2,763,788 A | 9/1956 | Herzog | |
| 2,934,652 A | 4/1960 | Caldwell et al. | |
| 3,073,958 A | 1/1963 | Youmans | |
| 3,321,625 A | 5/1967 | Wahl | |
| 3,321,627 A | 5/1967 | Tittle | |
| 3,435,217 A | 3/1969 | Givens | |
| 3,453,433 A | 7/1969 | Alger et al. | |
| 3,483,376 A | 12/1969 | Locke et al. | |
| 3,491,238 A | 1/1970 | Allen | |
| 3,509,346 A | 4/1970 | Mills, Jr. et al. | |
| 3,566,117 A | 2/1971 | Tixier | |
| 3,566,118 A | 2/1971 | Peters | |

(Continued)

FOREIGN PATENT DOCUMENTS

GB         862434         3/1961

(Continued)

OTHER PUBLICATIONS

Wilson, Robert D., "Bulk Density Logging with High-Energy Gammas Produced by Fast Neutron Reactions with Formation Oxygen Atoms."

*Primary Examiner*—Constantine Hannaher
(74) *Attorney, Agent, or Firm*—Kevin P. McEnane; Jaime Castano (57) ABSTRACT

System and method for formation logging using a gamma-ray detector. The techniques including acquiring gamma-ray signals using the gamma-ray detector, the acquired gamma-ray signals having energies that span at least a first-energy region and a second-energy region, wherein the first-energy region includes energies higher than a selected threshold and the second-energy region includes energies lower than the selected threshold; determining interference signals based on the acquired gamma-ray signals in the first-energy region; and correcting the acquired gamma-ray signals in the second-energy region based on the interference signals to provide corrected gamma-ray signals.

19 Claims, 6 Drawing Sheets

U.S. PATENT DOCUMENTS

| | | |
|---|---|---|
| 3,662,173 A | 5/1972 | Youmans |
| 3,789,219 A | 1/1974 | Wilson |
| 3,971,935 A | 7/1976 | Nelligan |
| 4,005,200 A | 1/1977 | Utsumi et al. |
| 4,048,495 A | 9/1977 | Ellis |
| 4,055,763 A | 10/1977 | Antkiw |
| 4,122,339 A | 10/1978 | Smith, Jr. et al. |
| 4,122,340 A | 10/1978 | Smith, Jr. et al. |
| 4,152,590 A | 5/1979 | Smith, Jr. et al. |
| 4,379,228 A | 4/1983 | Allen |
| 4,381,449 A | 4/1983 | Smith, Jr. |
| 4,387,302 A | 6/1983 | Givens |
| 4,409,481 A | 10/1983 | Smith, Jr. et al. |
| 4,436,996 A | 3/1984 | Arnold et al. |
| 4,446,368 A | 5/1984 | Koenn et al. |
| 4,454,420 A | 6/1984 | Smith, Jr. |
| 4,529,877 A | 7/1985 | Arnold |
| 4,568,829 A | 2/1986 | Ruckebusch |
| 4,618,765 A | 10/1986 | Sonne |
| 4,631,405 A | 12/1986 | Smith, Jr. |
| 4,645,926 A | 2/1987 | Randall |
| 4,691,102 A | 9/1987 | Schultz et al. |
| 4,760,252 A | 7/1988 | Albats et al. |
| 4,814,611 A | 3/1989 | Moake |
| 4,947,040 A | 8/1990 | Mahdavi et al. |
| 5,235,185 A | 8/1993 | Albats et al. |
| 5,313,504 A | 5/1994 | Czirr |
| 5,377,105 A | 12/1994 | Smith |
| 5,390,115 A | 2/1995 | Case et al. |
| 5,434,408 A | 7/1995 | Smith, Jr. et al. |
| 5,459,314 A | 10/1995 | Plasek |
| 5,539,225 A | 7/1996 | Loomis et al. |
| 5,699,246 A | 12/1997 | Plasek et al. |
| 5,767,510 A | 6/1998 | Evans |
| 6,032,102 A | 2/2000 | Wijeyesekera et al. |
| 6,376,838 B1 | 4/2002 | Odom |
| 6,389,367 B1 * | 5/2002 | Plasek ........................ 702/104 |
| 6,495,837 B2 | 12/2002 | Odom et al. |
| 6,639,210 B2 | 10/2003 | Odom et al. |
| 6,703,606 B2 | 3/2004 | Adolph |
| 6,754,586 B1 | 6/2004 | Adolph et al. |
| 2003/0178560 A1 | 9/2003 | Odom et al. |
| 2004/0222368 A1 | 11/2004 | Odom et al. |

FOREIGN PATENT DOCUMENTS

| | | |
|---|---|---|
| GB | 1405299 | 9/1975 |
| GB | 2087072 | 5/1982 |
| GB | 2117901 | 10/1983 |
| WO | WO 2004/081605 A2 | 9/2004 |

* cited by examiner

CORRECTIONS OF GAMMA-RAY RESPONSES

CROSS-REFERENCE TO RELATED APPLICATIONS

This claims priority of U.S. Provisional Application Ser. No. 60/657,180, filed on Feb. 28, 2005, which is incorporated by reference in its entirety. This is related to co-pending applications, entitled: "Sigma/Porosity Tools with Neutron Monitors", and "Apparatus and Methods for Interlaced Density and Neutron Measurements", both assigned to the present assignee and filed concurrently with the present application.

BACKGROUND OF INVENTION

1. Filed of the Invention

The invention relates to well logging with nuclear tools. In particular, it relates to apparatus and methods for the determination of formation properties using gamma-ray tools.

2. Background Art

The characteristics of geological formations are of significant interest in the exploration and production of subsurface water and mineral deposits, such as oil and gas. Many characteristics, such as the hydrocarbon volume, porosity, lithology, reservoir location, and permeability of a formation, may be deduced from certain measurable quantities. Among these quantities are: density, porosity, photoelectric factor (Pe), hydrogen index, salinity, and thermal neutron capture cross section (Sigma). These quantities are typically measured by logging-while-drilling (LWD) or wireline tools.

Some logging tools may detect signals originated from the formations without input of external energy. Other logging tools may carry a source that radiates or emits energy into the formation and one or more detectors that can sense the resulting interactions of the radiation. Detected signal data are typically transmitted uphole, temporarily stored downhole for later processing, or combined in both techniques, to evaluate the geological formation from which the data was gathered.

Figure 1:
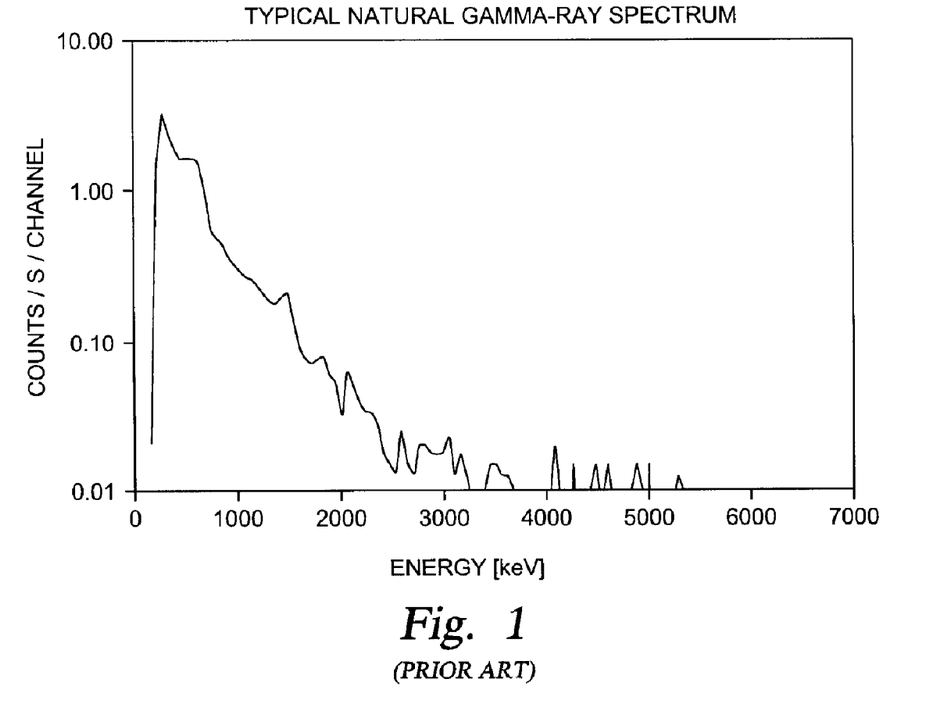
FIG. 1 shows a typical natural gamma-ray spectrum.

Natural gamma-ray measurements are performed with detectors that can measure the radioactivity of earth formations surrounding a borehole. A gamma-ray detector may comprise any suitable type of detector, such as NaI, BGO, CsI, anthracene, etc., see U.S. Pat. Nos. 4,647,781 and 4,883,956. In some cases, detailed analysis of the natural gamma-ray emission is desired so that contributions from the three principal naturally occurring radioactive substances: Thorium, Uranium and Potassium, can be separated. In such a case, the energy spectrum of the gamma-rays is measured either by the acquisition of several energy windows which are optimized to be mainly sensitive to one of the three isotopes or by acquiring a detailed spectral response through a multi-channel analysis. For example, a spectrum acquired by a NaI(Tl) scintillation spectrometer is shown in FIG. 1. This spectrum indicates a typical natural background, which comes from a mix of Th, U and K. Very little Th is visible in this spectrum, which appears to be dominated by U and K. In this spectrum, gamma-rays above 2600 keV are due to cosmic radiation.

Typically, the signals from natural radioactivity are very weak and easily biased by radiation from other sources. Currently, these measurements do not allow correction for background radiations caused by external sources, except for the correction for O-activation in the borehole fluid as disclosed in a co-pending U.S. Application Publication No. 2005/0127282 A1. This application by Grau et al. is assigned to the present assignee and is incorporated by reference in its entirety.

In addition to natural gamma ray measurements, some gamma ray tools include a nuclear energy source. Examples include nuclear formation density measurements, which are based on detecting Compton scattered gamma-rays in one or more gamma-ray detectors installed at a suitable distance from a neutron, gamma-ray, or x-ray source. The signals (count rates) detected by such tools are generally much stronger than natural gamma-ray measurements. Therefore, the detectors can be made smaller and, therefore, less sensitive to background effects from extraneous radiations.

Gamma-ray logging tools are often used together with other tools, including neutron tools. When gamma-ray detectors are used together with neutron sources, care must be taken to avoid detecting undesired neutron-induced background signals. To this aim, the gamma detectors are often placed at a distance from the neutron sources. However, it is generally preferred that logging tools be made shorter. As these tools become shorter, the detectors will have to be brought closer to the energy source. There may be situations where the gamma-ray measurements could be influenced by emission from the onboard source, e.g., neutron induced gamma-rays. Currently, there are no methods available to correct for this kind of interference, though correction for borehole fluid and formation activation are disclosed in U.S. Pat. No. 5,459,314, issued to Plasek. This patent is assigned to the present assignee and is incorporated by reference in its entirety.

SUMMARY

One aspect of the invention relates to methods for formation logging using a gamma-ray detector. A method in accordance with one embodiment of the invention includes acquiring gamma-ray signals using the gamma-ray detector, the acquired gamma-ray signals having energies that span at least a first-energy region and a second-energy region, wherein the first-energy region includes energies higher than a selected threshold and the second-energy region includes energies lower than the selected threshold; determining interference signals based on the acquired gamma-ray signals in the first-energy region; and correcting the acquired gamma-ray signals in the second-energy region based on the determined interference signals to derive corrected gamma-ray signals.

Another aspect of the invention relates to a system for formation logging. The system comprising a tool having a support configured for movement in a borehole penetrating a formation; a gamma-ray detector disposed on the support and configured to detect gamma-ray signals in at least two energy regions; a nuclear energy source disposed on the support and spaced apart from the gamma-ray detector; and a processor to accept a program with instructions to determine interference signals among gamma-ray signals acquired with the gamma-ray detector, the acquired gamma-ray signals having energies that span at least a first-energy region and a second-energy region, wherein the first-energy region includes energies higher than a selected threshold and the second-energy region includes energies lower than the selected threshold, and instructions to correct the acquired gamma-ray signals in the second-energy region based on the determined interference signals to derive corrected gamma-ray signals.

Other aspects and advantages of the invention will be apparent from the following description and the appended claims.

DETAILED DESCRIPTION

Embodiments of the invention relate to methods for correcting environmental effects in measurements collected by gamma-ray detectors, which may be on a natural gamma-ray tool or a density tool. Some embodiments of the invention relate to systems with logging tools including only a single gamma-ray detector, without relying on two detectors for environmental effects correction.

Figure 2:
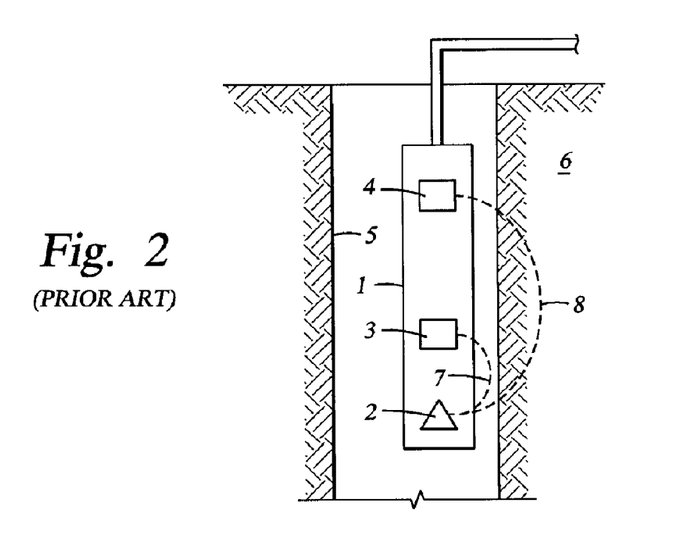
FIG. 2 shows a schematic of a conventional density tool including two gamma-ray detectors and a gamma-ray source.

Modern gamma-ray density logging tools typically use at least two gamma-ray detectors at two different axial spacings from the gamma-ray source for environmental effect corrections. FIG. 2 shows a schematic of a basic layout for a two detector gamma-ray logging tool (a density tool) disposed in a borehole. The density logging tool 1 consists of a short spaced (SS) gamma-ray detector 3 and a long spaced (LS) gamma-ray detector 4. In addition, the gamma-ray density 1 tool also includes a gamma ray source 2. The logging tool is disposed in a borehole 5 penetrating a formation 6. One of ordinary skill in the art would appreciate that the logging tool may be a wireline tool, a slick-line tool, a logging-while-drilling (LWD) tool, a measurement-while-drilling (MWD) tool, or a logging-while-tripping (LWT) tool.

Figure 3A:
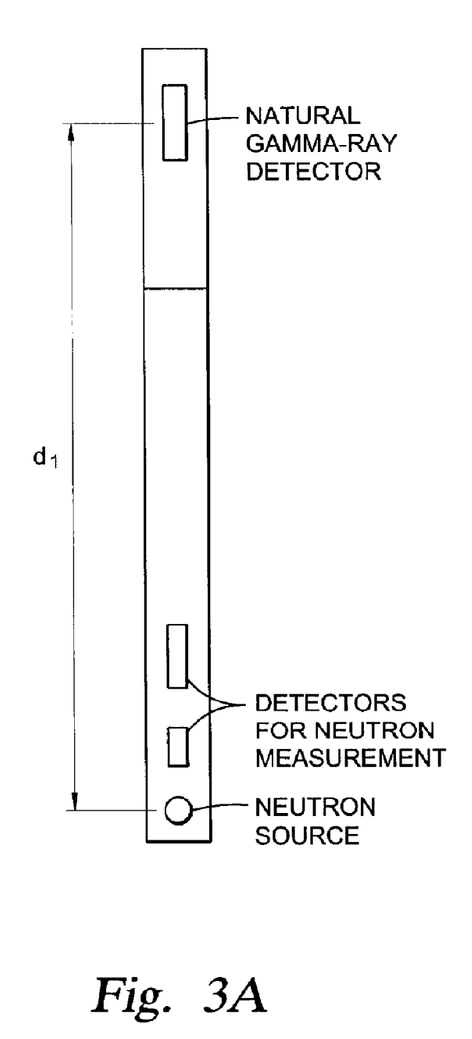
FIG. 3A shows a conventional tool string including a natural gamma-ray detector and a neutron tool in separate tool housings.

In a logging operation, a natural gamma-ray tool may be used together with a neutron tool that includes an onboard neutron source, as shown in FIG. 3A. As shown in this example, the neutron and the gamma-ray measurements are typically in two separate housings. In such tools, the natural gamma-ray detector should be kept at a distance from the neutron source in order to minimize any potential interference.

Figure 3B:
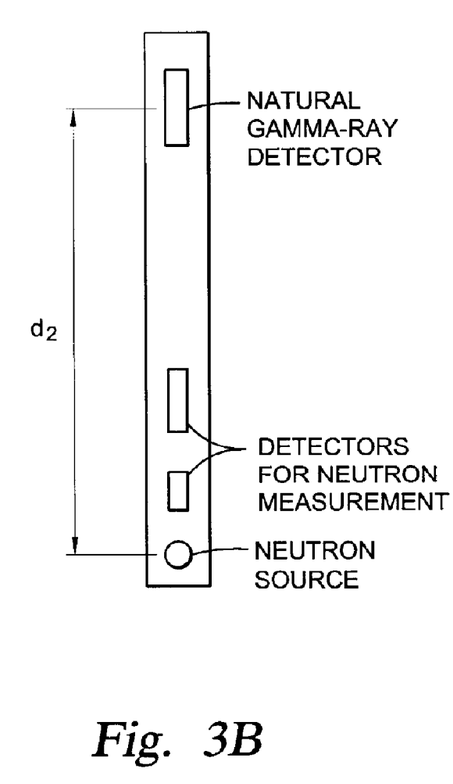
FIG. 3B shows a variation that includes the gamma-ray detector and the neutron tool in a single housing.

As noted above, it is desirable that the tools be made shorter. In a shorter tool design, the gamma and neutron measurements may be closely spaced in the same housing, as shown in FIG. 3B. In such tools, the spacing between the detectors and the source, as well as the internal shielding, should be chosen such that there is no measurable signal in the gamma-ray detector from gamma-rays induced by the neutrons emitted by the source in the neutron section. This requirement may be easily met in a drilling fluid filled borehole—the fluid and its contents minimize the distance over which the neutrons can travel and most neutron induced gamma-rays are produced far from the gamma-ray detector and do not reach it.

However, in air-filled boreholes, the distance between the neutron source and the natural gamma-ray detector in such a tool (shown as $d_2$ in FIG. 3B) may be too short to prevent neutrons from the source to travel close to the gamma-ray detector or to reach the gamma-ray detector—due to the absence of absorbing effects of the fluid in the borehole. The interactions of the neutrons with the surrounding material or the detector itself will generate gamma-rays, which may be detected by the gamma-ray detector and thus lead to extraneous signals.

With further shortening of the tools, it can be envisaged that in a very compact tool, the natural gamma-ray detector may be positioned too close (even shorter $d_2$) to the neutron source such that even in liquid filled borehole, there would be interference from neutron induced gamma-rays.

Figure 4A:
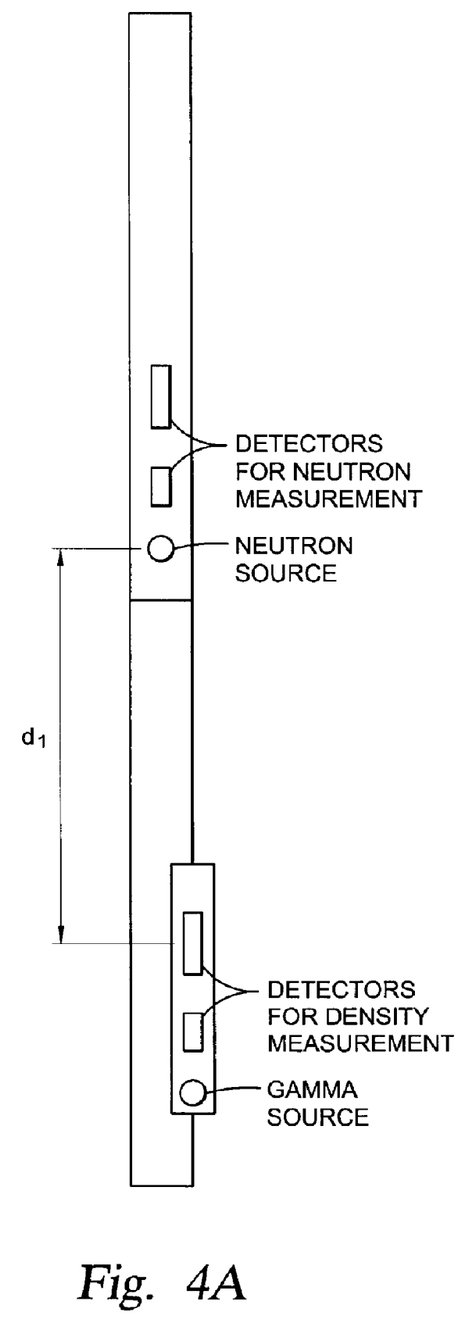
FIG. 4A shows a conventional tool string having a neutron tool and a gamma-ray density tool.
Figure 4B:
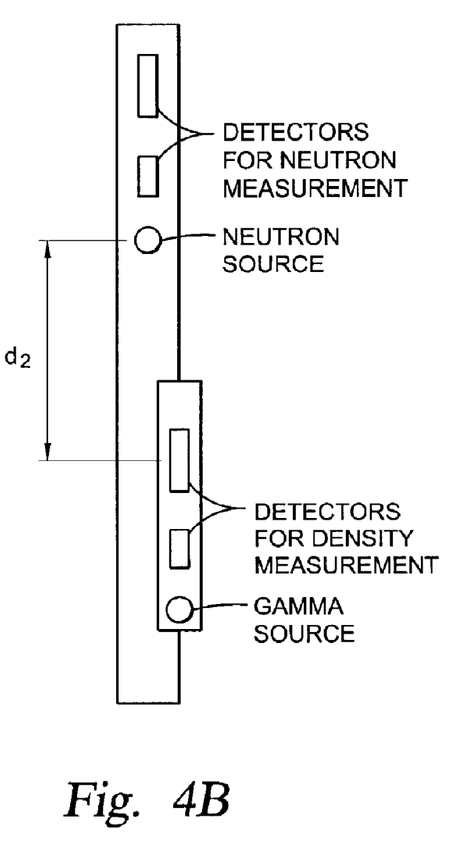
FIG. 4B show a shortened variation that includes the neutron tool and the gamma-ray density tool in the same housing.

The above described problems are more acute for natural gamma-ray detectors. However, even for density tools, interference from a nearby neutron source is possible. FIG. 4A shows a typical tool string with a neutron and a gamma-ray density tool next to each other. In this conventional set up the distance ($d_1$) between the neutron source and the gamma-ray detectors is preferably large enough such that the interference is negligible. However, in a compact tool design, as shown in FIG. 4B, the distance ($d_2$) between the neutron and the gamma-ray detectors is reduced, and interference from the neutron source becomes unavoidable.

In the conventional configuration shown in FIG. 4A, the distance ($d_1$) between the neutron source and the gamma-ray detectors for the density measurement is large so that there is no interference from neutron induced gamma-rays. Depending on the tool design and the source strength of the logging sources, this requires that the distance between the neutron source and the closest gamma-ray detector be greater than 1 to 1.5 m. Even with such a long distance, an indirect influence is still possible due to activation of materials in the formation by the neutron source, as described in U.S. Pat. No. 5,459,314. Such indirect interference is significant if the neutron source leads the gamma-ray detectors in the tool string (e.g. if the tool string is moving up and the neutron source is above the gamma-ray measurement and thus the gamma-ray measurement passes over the zones previously activated by the neutron source) and typically when using a strong source (e.g., d-T generator). In such cases, correction for the interference will be necessary. With the compact configurations shown in FIG. 4B, correction for the neutron induced gamma-ray background signals will also be required. Embodiments of the invention provide methods to correct for neutron-induced interference in the measured natural gamma-ray signals or the density measurement signals.

In accordance with some embodiments of the invention, methods for correcting neutron-induced gamma ray interference may be based on the high-energy and low-energy portions of the detected gamma ray spectrum. These methods may be applied with gamma ray measurements made with a single detector or with multiple detectors. Therefore, these methods are applicable to both natural gamma ray detections or gamma ray density measurements.

Figure 5:
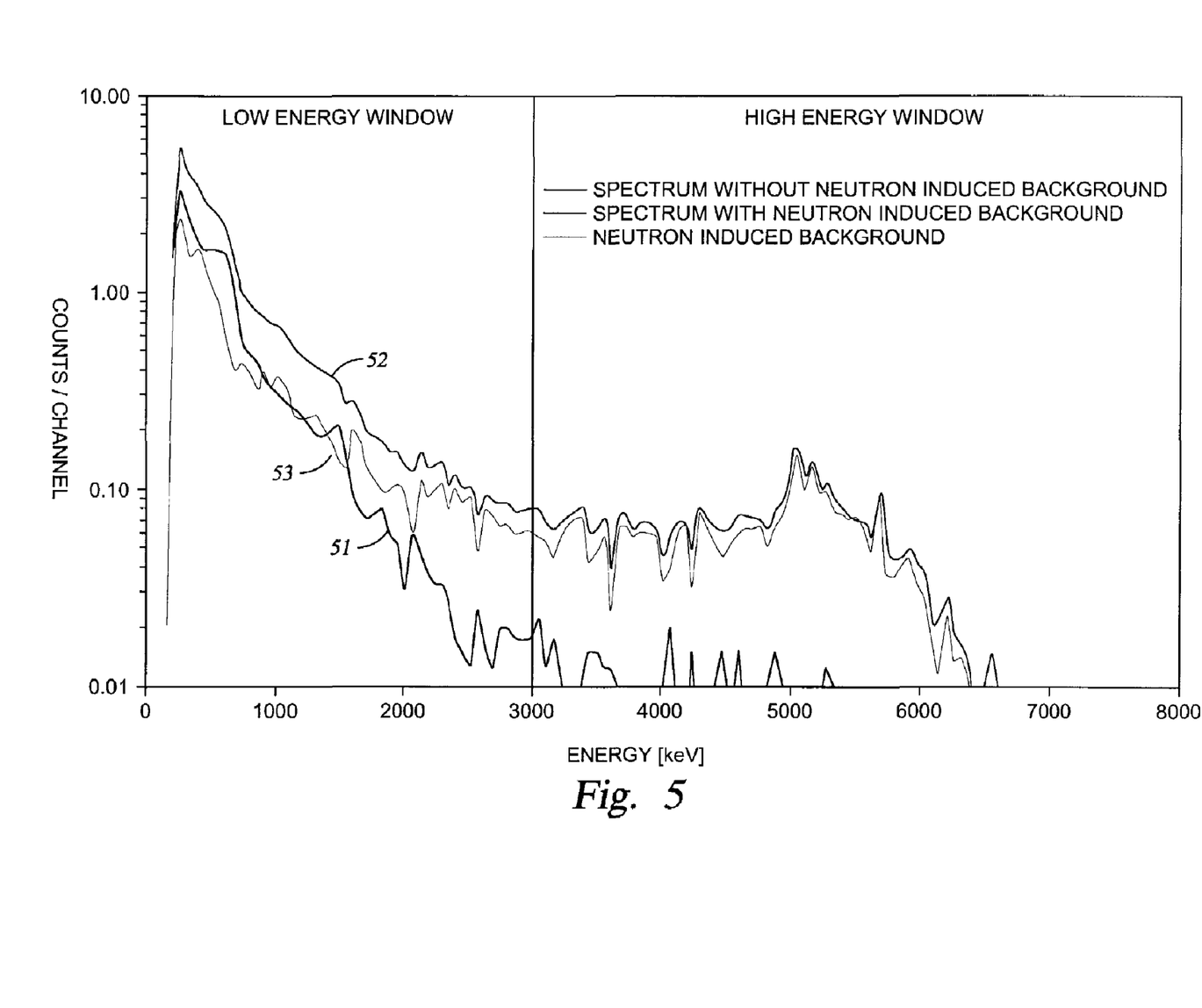
FIG. 5 shows spectra of gamma-rays recorded in two energy windows in accordance with one embodiment of the invention.

This is illustrated in FIG. 5, in which curve 51 shows a natural gamma-ray spectrum without neutron-induced background, curve 52 shows a spectrum with neutron-induced background, and curve 53 shows a spectrum of the neutron-induced background.

FIG. 5 shows that the high-energy region (e.g., greater than 3000 keV) of a measured spectrum (curve 52) is severely influenced by signals from neutron-induced background, while the signals of interest are mostly in the low energy region (less than 3000 KeV). Note that it would not be sufficient to ignore the high energy gamma-rays and simply use the count rates from the low energy window, because neutron induced gamma-rays (see e.g., curve 53) cover the entire range. Instead, the signals in the low-energy range (or window) should be corrected to remove the influence of neutron-induced background signals. Note that in FIG. 5, the two energy windows abut each other. One of ordinary skill in the art would appreciate that this is not necessary.

FIG. 5 shows that energy discrimination can be used to provide two sets of measurements that include different degrees of environmental influences. To obtain energy discrimination, the gamma ray spectrum may be recorded with two or more windows tuned to different energy ranges, or the entire energy spectrum may be recorded for later analysis. In accordance with some embodiments of the invention, natural gamma-ray spectra or the gamma-ray spectra of a density detector, for example, may be divided into at least two regions. One region covers low energies up to the maximum energy expected in the measurement (e.g., 3000 keV for the natural gamma ray measurement and about 800 keV for a $^{137}$Cs based density measurement). The second region includes all the gamma-rays with energies above the maximum energy expected in the measurement (see FIG. 5). The signals obtained in these two or more regions can then be used to correct the low-energy region signals using methods of the invention, which are described below.

In accordance with some embodiments of the invention, a method for neutron-induced background correction may involve subtracting signals or count rates (or a fraction or a multiple thereof) of the high-energy region from the count rates of the low-energy region.

This approach assumes that there is a direct relationship between the counts in the high energy window and the low-energy background counts generated by neutron induced gamma-rays, and, therefore, the background signals (interference) in the low-energy window can be inferred from the high-energy counts, as illustrated in the following equation:

$$N(\text{neutron-low-energy}) = C \cdot N(\text{neutron-high-energy}) \quad (1a)$$

Equation (1a) states that the neutron-induced signals in the low-energy window, N(neutron-low-energy), is related to those in the high-energy window, N(neutron-high-energy), by a correction constant C. Therefore, the amount of correction needed can be obtained from the count rates in the high-energy window by a judicial selection of a correction constant C, which may be determined by trial-and-error, modeling, tool calibration, or by other criteria.

In accordance with a modification of the above method, the low-energy part of the spectrum may be divided into multiple windows, each of which has its own correction coefficient $C_i$, where i is the number of the low energy windows.

$$N_i(\text{neutron-low-energy}) = C_i \cdot N(\text{neutron-high-energy}) \quad (1b)$$

To obtain the true (corrected) signal in the detector, one can therefore subtract the estimated low energy neutron-induced counts from the total counts in the low-energy part of the spectrum.

$$N_i(\text{natural\_gamma\_ray-net}) = N_i(\text{low\_energy\_tot}) - C_i \cdot N(\text{neutron\_high\_energy}) \quad (2)$$

The procedure outlined above requires that the total gain of the acquisition system be constant (or can be corrected for) over time and as a function of temperature. This is usually accomplished by active gain regulation. Typical natural gamma-ray systems are not gain regulated. In accordance with preferred embodiments of the invention, the gain is regulated with any method known in the art. One example of gain regulation is disclosed in the co-pending U.S. Patent Application Publication No. 2005/0127282.

In accordance with other embodiments of the invention, the signals associated with the high-energy range may be first analyzed to derive a function (e.g., a spectral shape). The shape of the high energy part of the spectrum can then be used to compute associated low-energy responses due to the interfering effects (e.g., neutron-induced signals). This may yield a more accurate (than the above described method) estimate of the effects (e.g., neutron-induced signals) in the low-energy counts. In accordance with this approach, Equation (1a) becomes:

$$N(\text{neutron-low-energy}) = f(N(E)_{HE}), \quad (3)$$

where $N(E)_{HE}$ represents the gamma-ray spectral distribution (spectral shape) in the high-energy window, which is dominated by neutron-induced signals. The amounts needed for correction in the low-energy counts are then derived from this spectral shape analysis. As with methods described above, this approach also requires gain regulation.

In accordance with some embodiments of the invention, background signals may be obtained from a time period when the neutron source does not emit energy into the environment. This is possible if the neutron source is a pulsed neutron source. In this case, the background free gamma-ray counts (in the absence of activation) can be determined while the neutron generator is turned off for a duration that is long enough to allow the thermal neutrons to die away.

Generally, the duty cycle for "neutron free" acquisition is very short in logging operations, and thus the signals are susceptible to statistical errors. However, with appropriate filtering, the coefficient C shown in Equation 1a or 1b can be determined more accurately, and thus the net signals can be determined from the "neutron contaminated" measurements by subtracting the background from the measurements, as outlined in the above methods. The results of this method will be more accurate than those obtainable with the above described methods and more precise than the results from the "neutron free" acquisition. Further improvements may be possible through alpha-filtering the "neutron free" result with the corrected "neutron contaminated" result.

Figure 6:
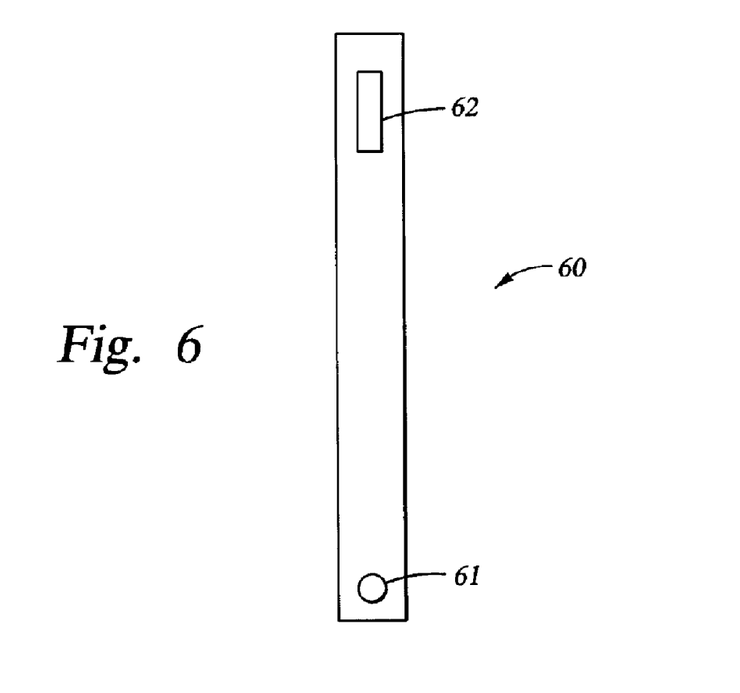
FIG. 6 shows a schematic of a gamma-ray tool having a single detector in accordance with one embodiment of the invention.

Some embodiments of the invention relate to gamma-ray logging tools that are optimized for environmental correction using a single gamma-ray detector. FIG. 6 shows a schematic of a tool in accordance with one embodiment of the invention. As shown, the tool 60 includes a single detector 62 and a nuclear energy source 61. The single detector 62 is preferably located at a position midway between the conventional SS and LS detectors of the two-detector design—probably at about 20.3 cm-25.4 cm from the source 61 (depending on source energy). The exact location would be chosen to be close enough to the source to yield good counting statistics, but far enough from the source to result in good density sensitivity and minimal environmental effects.

A gamma ray detector, in accordance with embodiments of the invention, may comprise any suitable type of detectors, such as NaI, BGO, CsI, anthracene, etc., see U.S. Pat. Nos. 4,647,781 and 4,883,956. In preferred embodiments, the gamma-ray detector may be an inorganic scintillator (NaI(Tl) or any other scintillator suitable for detecting gamma-rays in a logging environment. The scintillator is coupled to a photomultiplier (not shown) suited for well logging applications, as well known in the art. The gamma-ray detector may be operated in the plateau mode to measure count rates. Alternatively, the detector may be used to record gamma-ray spectra in addition to measuring count rates. The gamma-ray spectra may be used to derive formation lithology using any methods known in the art.

Figure 7:
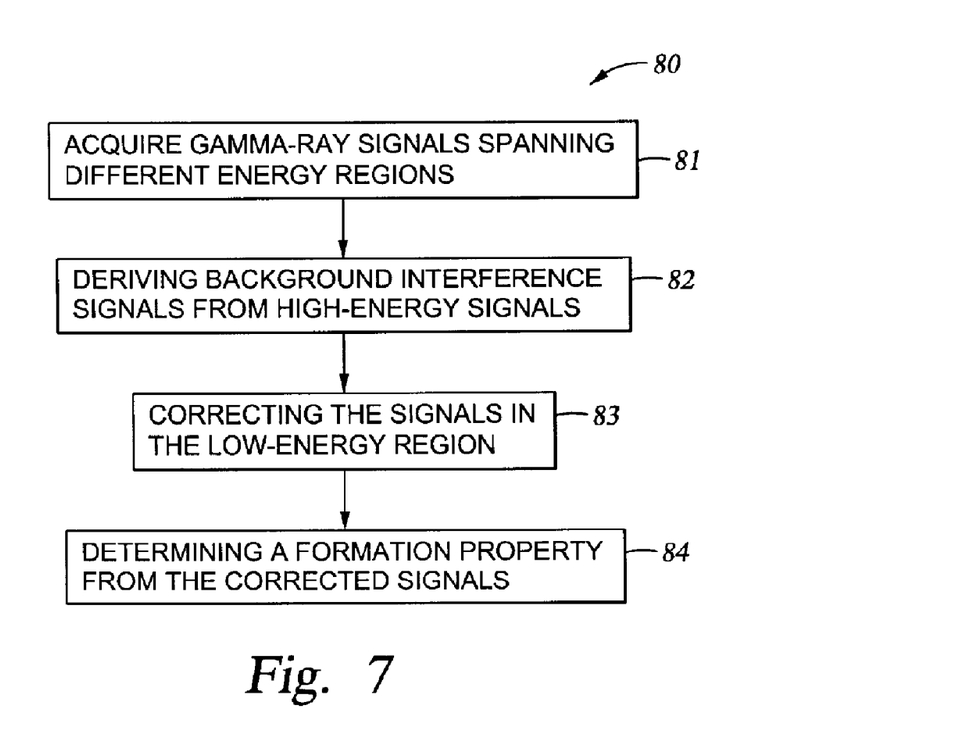
FIG. 7 shows a flow chart illustrating a method in accordance with one embodiment of the invention.

Some embodiments of the invention relate to methods for gamma-ray density logging using a single detector. FIG. 7 shows a flow chart illustrating a method in accordance with one embodiment of the invention. As shown, the method 80 comprises the steps of acquiring gamma-ray signals using a single detector capable of obtaining gamma ray spectrum in different energy ranges (step 81). The acquisition may be performed with two or more energy windows or by recording the entire spectral range. Then, a correction factor is derived from the measurements of a high energy window or region (step 82). Correction is then made in the signals detected in the low-energy window or region (step 83). The correction may be performed with various methods described above. The corrected signals in the low-energy region may then be used to derive a formation property (step 84).

Figure 8:
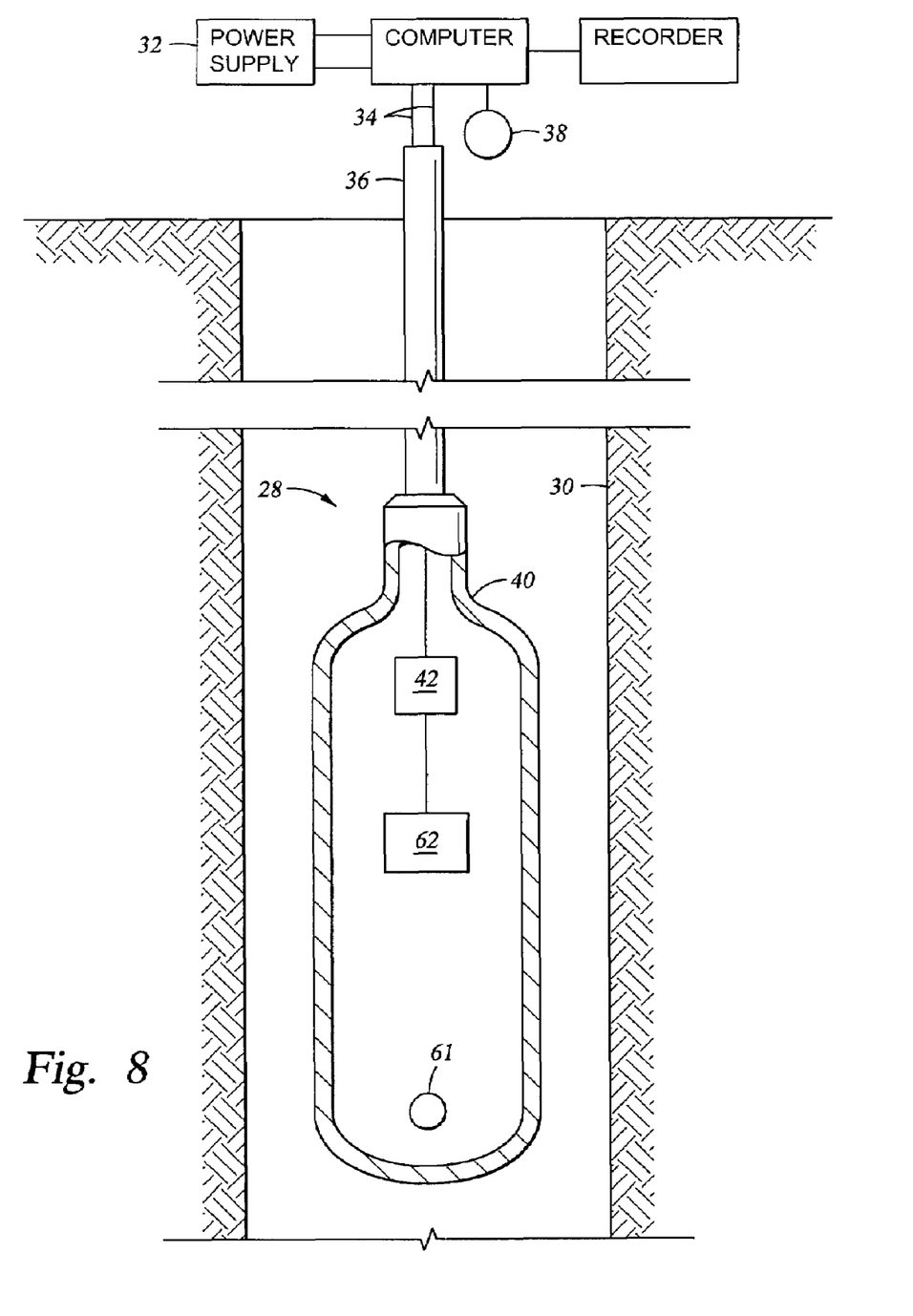
FIG. 8 shows a system with a downhole tool disposed in a subsurface borehole and equipped with a gamma-ray detector and a nuclear energy source in accordance with one embodiment of the invention.

FIG. 8 shows a system in accordance with an embodiment of the invention. A nuclear energy source 61 is shown mounted in a downhole tool 28 disposed in a borehole 30 that penetrates an earth formation. The tool 28 also includes a gamma-ray detector 62, and a microprocessor 42 linked therein. The tool 28 is shown supported in the borehole 30 by a logging cable 36 in the case of a wireline system or a drill string 36 in the case of a while-drilling system. With a wireline tool, the tool 28 is raised and lowered in the borehole 30 by a winch 38, which is controlled by the surface equipment 32. Logging cable or drill string 36 includes conductors 34 that connect the downhole microprocessor 42 with the surface equipment 32 for signal and control communication. Alternatively, these signals may be processed or recorded in the tool 28 and the processed data transmitted to the surface equipment 32.

It will be apparent to those skilled in the art that embodiments of this invention may be implemented by programming one or more suitable general-purpose microprocessors. The programming may be accomplished through the use of one or more program storage devices readable by the processor and encoding one or more programs of instructions executable by the processor for performing the operations described above. The program storage device may take the form of, e.g., one or more floppy disks; a CD ROM or other optical disk; a magnetic tape; a read-only memory chip (ROM); and other forms of the kind well-known in the art or subsequently developed. The program of instructions may be "object code," i.e., in binary form that is executable more-or-less directly by the processor; in "source code" that requires compilation or interpretation before execution; or in some intermediate form such as partially compiled code. The precise forms of the program storage device and of the encoding of instructions are immaterial here. Thus these processor means may be implemented in the surface equipment 32, in the tool 28, or shared by the two as known in the art.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for formation logging using a gamma-ray detector, comprising:
    acquiring gamma-ray signals using the gamma-ray detector, the acquired gamma-ray signals having energies that span at least a first-energy region and a second-energy region, wherein the first-energy region includes energies higher than a selected threshold, the threshold at an energy level above which substantially all gamma radiation results from neutron activation events and the second-energy region includes energies lower than the selected threshold;
    determining interference signals based on the acquired gamma-ray signals in the first-energy region; and
    correcting the acquired gamma-ray signals in the second-energy region based on the interference signals to provide corrected gamma-ray signals.

2. The method of claim 1, wherein the determined interference signals comprise neutron-induced signals.

3. The method of claim 2, further comprising deriving a formation density from the corrected gamma-ray signals.

4. The method of claim 3, wherein the formation property is a formation density.

5. The method of claim 3, wherein the formation property is the formation natural gamma-ray radiation.

6. The method of claim 3, wherein the selected threshold is about 3000 keV.

7. The method of claim 3, wherein the first-energy region spans from about 3000 keV to about 5000 keV.

8. The method of claim 3, wherein the second-energy region spans from about 100 keV to about 3000 keV.

9. The method of claim 1, wherein the interference signals are determined from the acquired gamma-ray signals in the first-energy region and a correction constant.

10. The method of claim 1, wherein the correction comprises dividing the second-energy region into a plurality of sub-regions.

11. The method of claim 1, wherein the determining the interference signals comprises analyzing a spectral shape of the acquired gamma-ray signals in the first-energy region.

12. The method of claim 1, further comprising acquiring background gamma-ray signals when an energy source is turned off.

13. The method of claim 12, wherein determining the interference signals includes using the background gamma-ray signals to determine a new correction constant.

14. A system for formation logging, comprising:
    a tool having a support configured for movement in a borehole penetrating a formation;
    a gamma-ray detector disposed on the support and configured to detect gamma-ray signals in at least two energy regions;
    a nuclear energy source disposed on the support and spaced apart from the gamma-ray detector; and a processor to accept a program with instructions to determine interference signals among gamma-ray signals acquired with the gamma-ray detector, the acquired gamma-ray signals having energies that span at least a first-energy region and a second-energy region, wherein the first-energy region includes energies higher than a selected threshold, the threshold at an energy level above which substantially all gamma radiation results from neutron activation events, and the second-energy region includes energies lower than the selected threshold, and instructions to correct the acquired gamma-ray signals in the second-energy region based on the determined interference signals, wherein the interference signals are determined from gamma ray signals from the first region, to derive corrected gamma-ray signals.

15. The system of claim 14, wherein the nuclear energy source consists of one of a gamma-ray source, and x-ray source, and a neutron source.

16. The system of claim 15, wherein the determined interference signals comprise neutron-induced signals.

17. The system of claim 16, the program further comprising instructions to derive one of a formation density or the formation natural gamma-ray radiation from the corrected gamma-ray signals.

18. The system of claim 17, wherein the formation property is one of a formation density or the formation natural gamma-ray radiation.

19. The system of claim 14, wherein the processor is disposed within the tool.

* * * * *